United States Patent [19]
Patterson

[11] Patent Number: 5,947,256
[45] Date of Patent: Sep. 7, 1999

[54] TAG FOR IDENTIFYING RECYCLABLE MATERIALS AND METHOD AND APPARATUS FOR SAME

[75] Inventor: Hubert A. Patterson, Boca Raton, Fla.

[73] Assignee: Sensormatic Electronics Corporation, Boca Raton, Fla.

[21] Appl. No.: 08/785,887

[22] Filed: Jan. 21, 1997

[51] Int. Cl.⁶ ................................................ G07F 7/06
[52] U.S. Cl. .................................... 194/209; 340/572
[58] Field of Search .................... 194/208, 209, 194/212, 213; 209/930; 340/551, 572

[56] References Cited

U.S. PATENT DOCUMENTS

| | | | |
|---|---|---|---|
| 4,219,127 | 8/1980 | Bielicki | 220/269 |
| 4,316,533 | 2/1982 | Hughes et al. | 194/213 |
| 4,510,489 | 4/1985 | Anderson, III et al. | 340/551 |
| 4,647,917 | 3/1987 | Anderson, III et al. | 340/572 |
| 4,660,025 | 4/1987 | Humphrey | 340/572 |
| 4,784,251 | 11/1988 | DeWoolfson et al. | 194/212 X |
| 4,980,670 | 12/1990 | Humphrey et al. | 340/551 |
| 5,357,240 | 10/1994 | Sanford et al. | 340/572 |
| 5,367,278 | 11/1994 | Yoshikawa | 335/285 |
| 5,469,140 | 11/1995 | Liu et al. | 340/551 |
| 5,593,017 | 1/1997 | Powell et al. | 194/212 |

*Primary Examiner*—F. J. Bartuska
*Attorney, Agent, or Firm*—Robin, Blecker & Daley

[57] ABSTRACT

A responsive tag and a method, apparatus and system for identifying a type of recyclable material. The tag includes an element attached to the recyclable material. The element responds to a selected interrogation signal of a recycling machine to provide a predetermined detectable signal associated with the type of recyclable material. The detectable signal is detected by a component in the recycling machine which then accepts the material for recycling.

35 Claims, 5 Drawing Sheets

FIG. 6

TAG FOR IDENTIFYING RECYCLABLE MATERIALS AND METHOD AND APPARATUS FOR SAME

FIELD OF THE INVENTION

This invention relates generally to a method, apparatus and system for identifying recyclable materials, and pertains more particularly to a responsive tag to be used for identifying different types of recyclable materials.

BACKGROUND OF THE INVENTION

Recycling of used materials has greatly increased over the years. Indeed, a much larger variety of materials are now being recycled unlike several years ago when aluminum and glass were the primary recyclable materials. However, because of this variety, the task of identifying and recovering usable materials requires sorting garbage and trash by hand. In turn, this need for manual labor to identify and sort materials greatly increases the costs associated with recycling.

Devices and methods have been developed to assist in the recycling process. One example is disclosed in U.S. Pat. No. 4,219,127 ("Bielicki"). The Bielicki patent discloses a ferrous material element which is attached to a tab device of an aluminum can and which is magnetically responsive to a magnetic field. Since the ferrous material element is magnetically responsive to a magnetic field, the element attached to the tab device allows for the aluminum can to be extracted from trash and waste material when an outside magnetic field is applied thereto.

However, the magnetic responsiveness of the ferrous material element of Bielicki only helps in recovery of recyclable containers from trash and waste material, and particularly, in the recovery of only one type of recyclable container, i.e., aluminum. The Bielicki patent does not disclose means for being able to identify a variety of different types of recyclable materials.

It is, therefore, an object of the present invention to provide a responsive tag to identify a variety of different types of recyclable materials and containers.

It is an additional object of the present invention to provide a responsive tag which is not noticeable or removable from recyclable materials or containers.

It is another object of the present invention to provide a responsive tag which is simple in design and economical to manufacture.

It is a further object of the present invention to provide a responsive tag which can be incorporated in recyclable materials or containers at the place of manufacture.

It is an additional object of the present invention to provide a responsive tag to minimize costs associated with recycling.

SUMMARY OF THE INVENTION

In accordance with the principles of the present invention, the above and other objectives are realized in a responsive tag adapted to be attached to a recyclable material. The tag comprises an element which responds to a selected interrogation signal to provide a predetermined detectable signal. By associating the predetermined detectable signal with a particular type of recyclable material, detection of the detectable signal when the tag is attached to such recyclable material, will serve to identify the presence and type of recyclable material.

Tags may be similar to tags used for electronic article surveillance ("EAS") systems such as the electro-acoustic type utilizing magnetostrictive material, magnetic type utilizing harmonic principles or radio frequency type responding to a resonant frequency.

In the electro-acoustic embodiment of the invention, the active element of the tag is a magnetostrictive material positioned in a housing. For example, U.S. Pat. No. 4,510,489, issued to Anderson et al., discloses an element formed of a ribbon-shaped length of a magnetostrictive amorphous material contained in an elongated housing in proximity to a biasing magnetic element. The magnetostrictive element, having certain preselected dimensions, resonates mechanically at a predetermined frequency in response to a selected interrogation signal having an alternating magnetic field at a selected frequency when the element has been biased to an appropriate level. The mechanical resonance of the magnetostrictive element produces the detectable tag signal.

The responsive tag may be attached to a surface of the tab portion of a recyclable container. The predetermined resonant frequency of the magnetostrictive element is then associated with a particular type of recyclable material or container. When the material or container with the responsive tag attached is placed in a recycling or reverse-vending machine, a biasing component in the machine provides a D.C. magnetic field to bias the tag to the appropriate level. A generating component also generates an alternating magnetic field at the selected frequency. A detecting component then detects whether the tag produces a detectable signal at the predetermined frequency and identifies the type of recyclable container based upon the detection of the detectable signal. If the detecting component detects the desired detectable signal unique to that type of recyclable material, the container is then crushed by a crushing component. A storage component then stores the crushed container in a storage area in the machine. If, however, the element of the tag does not produce the desired detectable signal, the container is rejected by a rejecting component.

In another embodiment of the invention, the active element of the tag is a magnetic material adapted to produce harmonic perturbations at a predetermined frequency when placed in an AC magnetic field having a selected interrogation signal at the selected frequency. The harmonic response of the magnetic element thus provides a detectable tag signal which is associated with a particular type of recyclable material or container to identify the presence and type of recyclable material.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
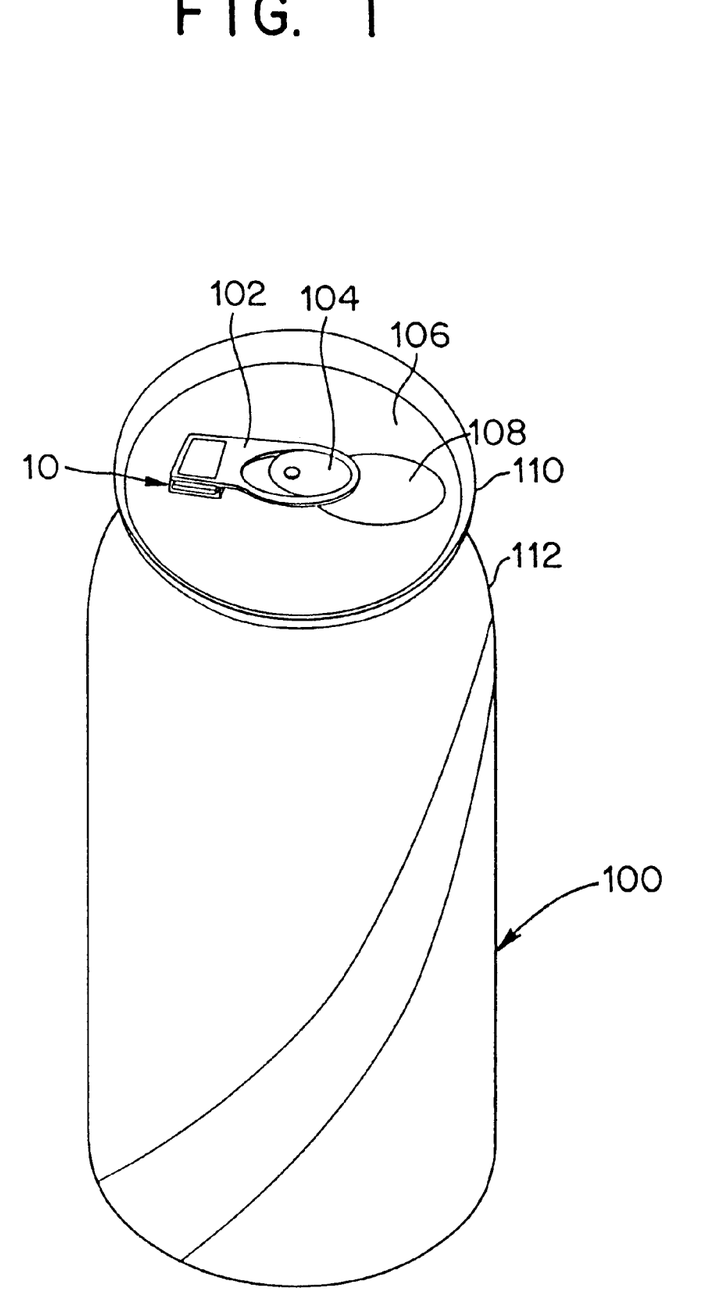
FIG. 1 shows a plan view of a responsive tag attached to a recyclable container in accordance with the principles of the present invention.
Figure 2:
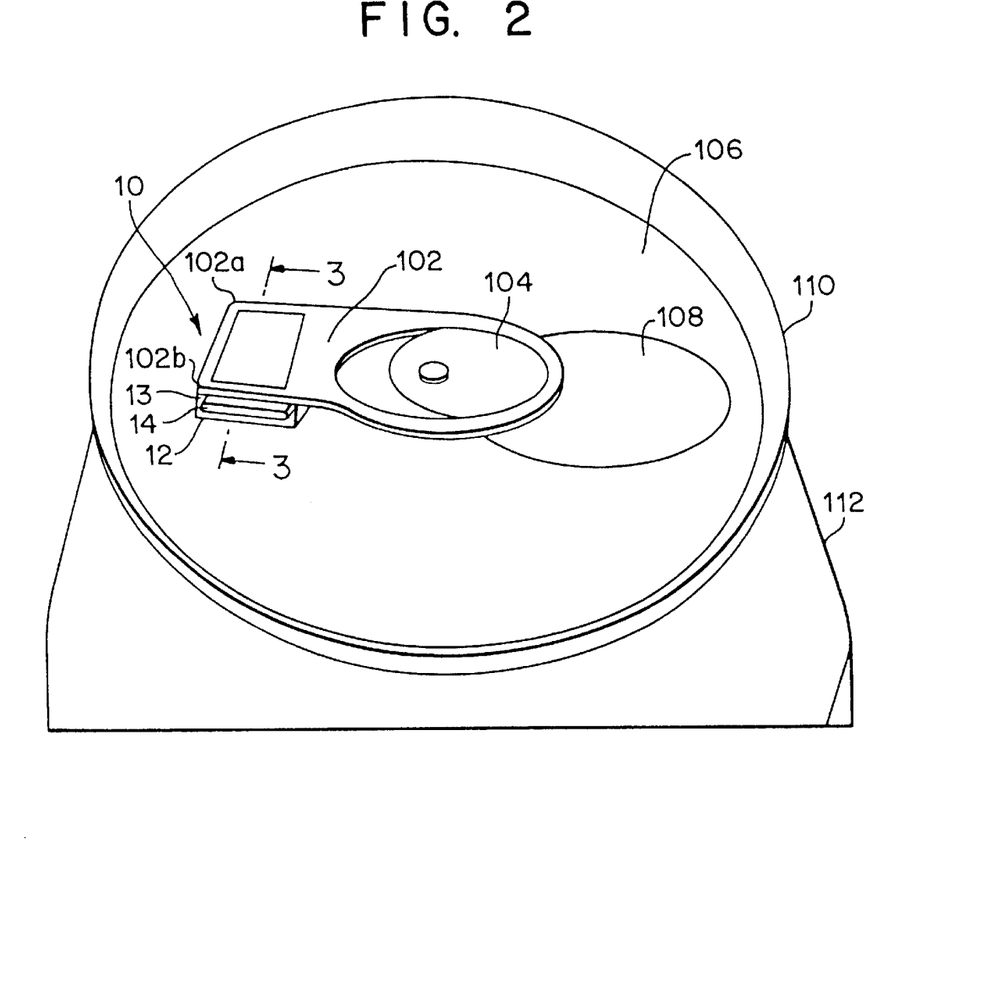
FIG. 2 shows an enlarged view of the responsive tag and the top of the recyclable container of FIG. 1.
Figure 3:
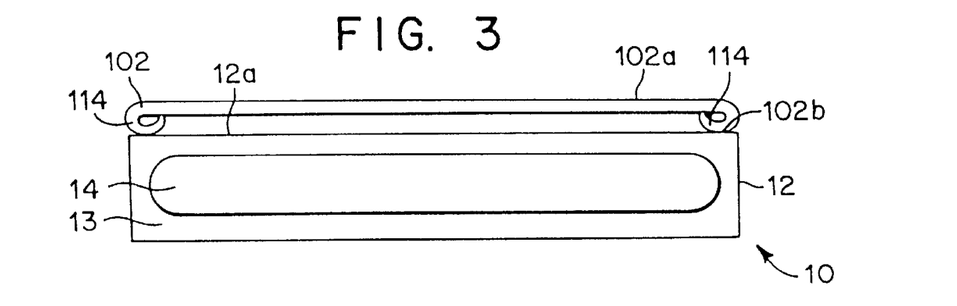
FIG. 3 shows a cross-sectional view of the responsive tag taken along the line 3—3 in FIG. 2.

FIGS. 1, 2 and 3 show a responsive tag 10 for use in identifying recyclable materials or containers in accordance with the principles of the present invention. The responsive tag 10 has a predetermined length such that, when appropriately biased and subjected to an alternating magnetic field, the tag will mechanically resonate at a predetermined frequency that is associated with a particular type of recyclable material. By using tags of different lengths, each adapted to produce a different predetermined resonant frequency, each associated with a different type of recyclable material, the different tags permit identification and sorting of different recyclable materials.

Figure 4:
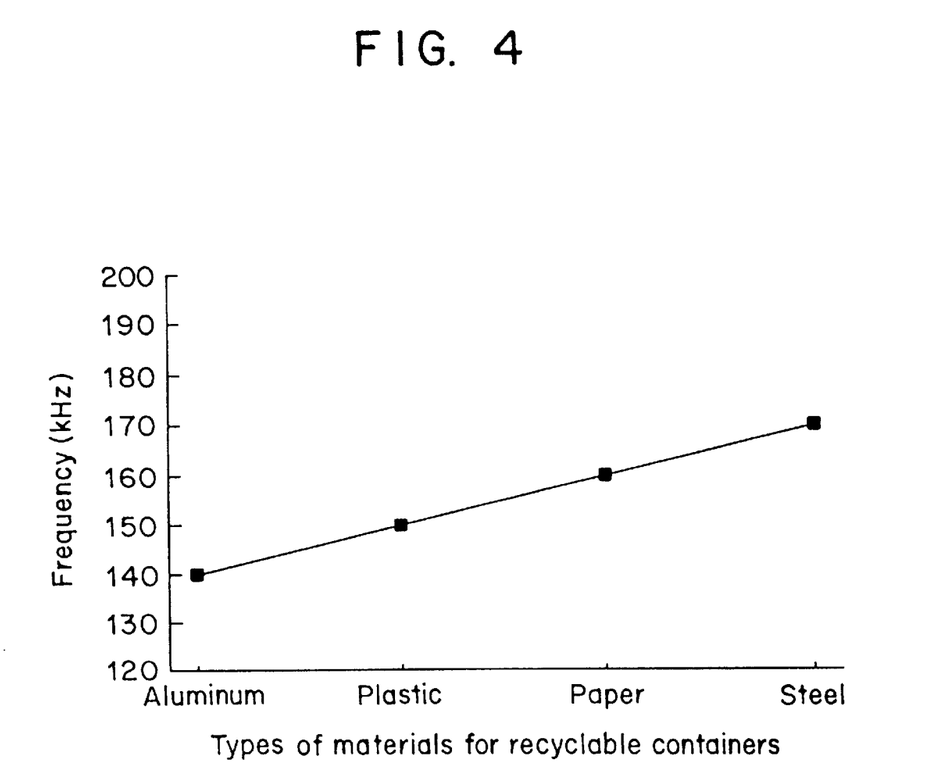
FIG. 4 shows a graph illustrating examples of predetermined frequencies at which the responsive tag of the present invention when attached to a particular recyclable material can resonate in order to produce a detectable tag signal.

For example, the electro-acoustic responsive tag 10 can be of a length adapted to have a predetermined resonant frequency in the frequency range of 120 kHz to 170 kHz. As illustrated by the chart of FIG. 4, the tag 10 can be made to resonate at, for example, 140 kHz for aluminum containers, 150 kHz for plastic containers, 160 kHz for paper containers, and 170 kHz for steel containers. The responsive tag 10, however, is not limited to these operating frequencies, but can have a variety of operating frequencies depending on the tag dimensions and the corresponding predetermined frequency desired to be associated with material of the container on which the tag is placed.

In the present illustrative embodiment as shown in FIGS. 1–3, the responsive tag 10 is attached to a recyclable container or can 100. The tag 10 comprises a magnetostrictive element 14 located in a housing 12. Element 14 may be an amorphous metal alloy such as Metglas® 2826MB made by Allied Corporation or any other suitable material such as is described in U.S. Pat. No. 5,469,140 ("'140 patent") which is incorporated by reference. The magnetostrictive material of the element 14 may also be heat-treated to have a hysteresis response to an alternating magnetic field with either no or relatively low-level harmonics, while being resonant in an alternating magnetic field of a much higher frequency. Such heat treatment of magnetostrictive material is disclosed in the '140 patent. Based upon this combination of a relatively low or no harmonic response at lower frequency alternating magnetic fields and a detectable mechanical resonance at a higher frequency as illustrated in the chart of FIG. 4, the tag 10 will not set off ordinary electronic article surveillance ("EAS") systems used in retail establishments because these operate by detection of harmonic responses to much lower frequencies than the frequencies at which element 14 is resonant.

As shown in FIG. 2, the housing 12 of the tag 10 attaches to a tab or tab portion 102 of the container 100. The tab portion 102 is attached to a top surface portion 106 of the container 100 by a hinge 104. By an upward movement of the tab portion 102 on the hinge 104, the tab portion 102 pushes an opening portion 108 downward to open the container 100. The container 100 also has a rim 110 and a body or body portion 112.

As further illustrated in the cross-sectional view of FIG. 3, the tab portion 102 has top and bottom surfaces 102*a* and 102*b*, respectively, with a top surface 12*a* of the housing 12 of the tag 10 being attached or adhered to the bottom surface 102*b*. The magnetostrictive element 14 is housed in a recess or cavity of the housing. The recess 13 is dimensioned so that the magnetostrictive element 14 can mechanically vibrate at the resonant frequency upon exposure to a D.C. biasing field and a suitable alternating magnetic field without being constrained by the walls of the recess 13. It should be noted that in the drawings the thicknesses of elements 102, 12, 13 and 14 have been exaggerated for clarity of illustration. In actual practice, the housing 12, recess 13 and magnetostrictive element 14 may be made quite thin and small, so that the tag 10 appears to be part of the tab portion 102 of the container 100. The dimensions of the magnetostrictive element 14 may be, for example, 6–12 mm in length and 2–3 mm in width. The actual dimensions are dependent on the frequency at which the tag is operated.

Figure 5:
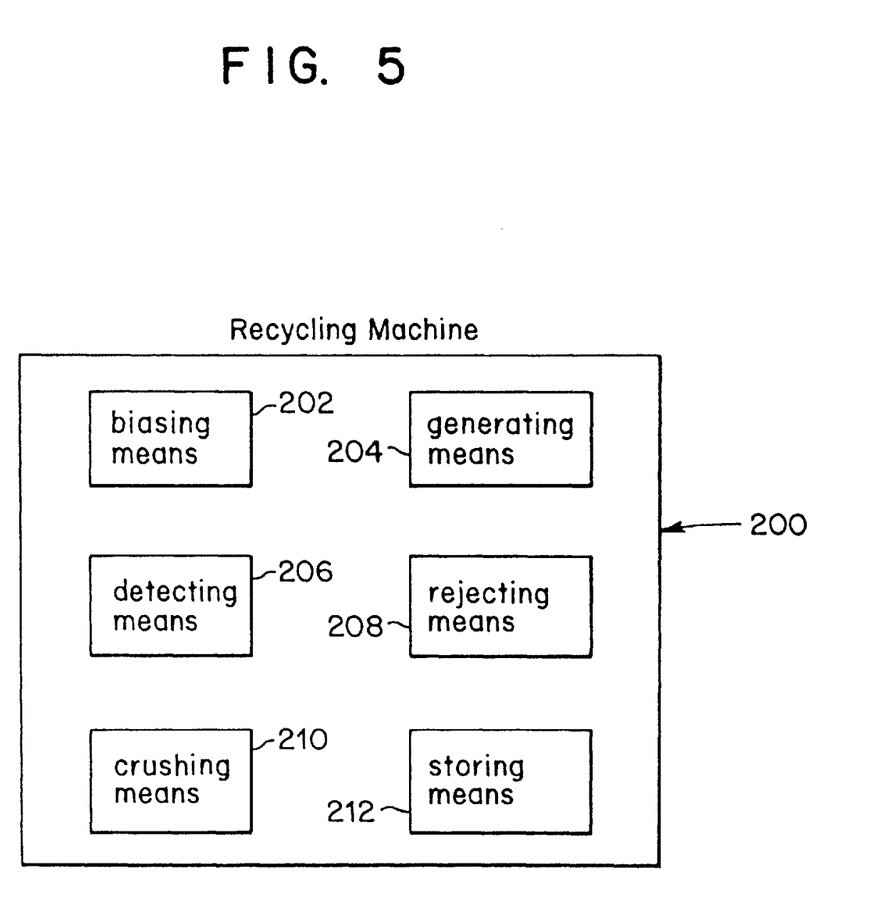
FIG. 5 shows a block diagram of the components for a recycling machine for use with the responsive tag of the present invention.

FIG. 5 illustrates a block diagram indicating the components of an apparatus for a suggested recycling or reverse-vending machine 200 for use with the responsive tag 10 and the method of identifying recyclable material. First, a user places a container 100 intended to be recycled and having a responsive tag 10 attached thereto in the reverse-vending machine 200. The machine 200 then positions and aligns the container 100 so that the tag 10 is about eight inches or less from biasing means or biasing component 202 which is located in the machine. The positioning and alignment of the tag 10 then triggers the biasing component 202 to activate a D.C. magnetic bias field and an alternating magnetic field produced by generating means or generating component 204. The alternating magnetic field is a selected interrogation signal at a selected frequency associated with a particular type of recyclable material. If the tag is on an aluminum container and deposited into an aluminum recycling machine, the responsive tag 10 will resonate at a predetermined frequency (e.g., 140 kHz) to produce a detectable tag signal. The tag signal is then detected by detecting means or detecting component 206 indicating that the container is aluminum. If the tag is on a steel or other type of container and is placed in the aluminum recycling machine, the tag will not resonate at the predetermined frequency for aluminum and the container will be rejected.

The generating component 204 may be a "pulse interrogation type" system which generates an alternating magnetic field for a particular duration. After this particular duration when the generating component 204 is not generating an alternating magnetic field, the detecting component 206 of the machine 200 is activated and detects whether the tag 10 is producing the detectable signal at the predetermined frequency. If the detecting component 206 detects the desired detectable signal produced by the tag 10, this identifies and confirms the type of recyclable container, (i.e., that the container 100 is, for example, aluminum).

Assuming that the tag 10 on the container 100 produces the desired detectable signal, the container is accepted and crushing means or crusher 210 is activated in the machine 200 to crush the container 100 thereby mechanically clamping the tag 10. Clamping of the tag 10 prevents the magnetostrictive element 14 from exhibiting the responsive mechanical resonance upon any further exposure to an alternating magnetic field. This prevents theft or re-recycling of recyclable containers so that no further reclaim is possible. Storing means or storage component 212 of the machine 200 then stores the crushed recyclable container in a storage area in the machine 200. The user will then receive a rebate in the form of coins, paper, or credit from the reverse-vending machine 200 based upon the number of containers returned to the machine 200 for recycling.

If, however, the user attempts to recycle a container which does not have a tag with the predetermined frequency response for that particular type of reverse-vending machine 200, rejecting means or a rejecting component 208 will indicate that the machine 200 does not accept this type of container for recycling and returns the container to the user.

This invention also contemplates a reverse vending machine with multiple compartments for recycling containers of more than one material type. For example, the generating component 204 may generate a sweep frequency including several frequencies causing the tag to resonate at the predetermined frequency depending on the type of material being detected. The detecting component 206 could then detect each different predetermined resonant frequency, for example sequentially, and then depending on which frequency is detected, the container could be directed to one direction or another to group all like materials in a separate storage component 212.

In addition, instead of having magnetostrictive elements 14 of different dimensions, with the biasing means located in the reverse-vending machine, the tags 10 could include magnetostrictive elements 14 of the same dimension and adjacent separate biasing means (not shown) included within the tag housing 12. Each biasing means would be biased to a different D.C. level, depending on the type of material to which the tag is attached, and thereby control the resonant frequency of the tag to correspond to the predetermined resonant frequency for that type of material.

Figure 6:
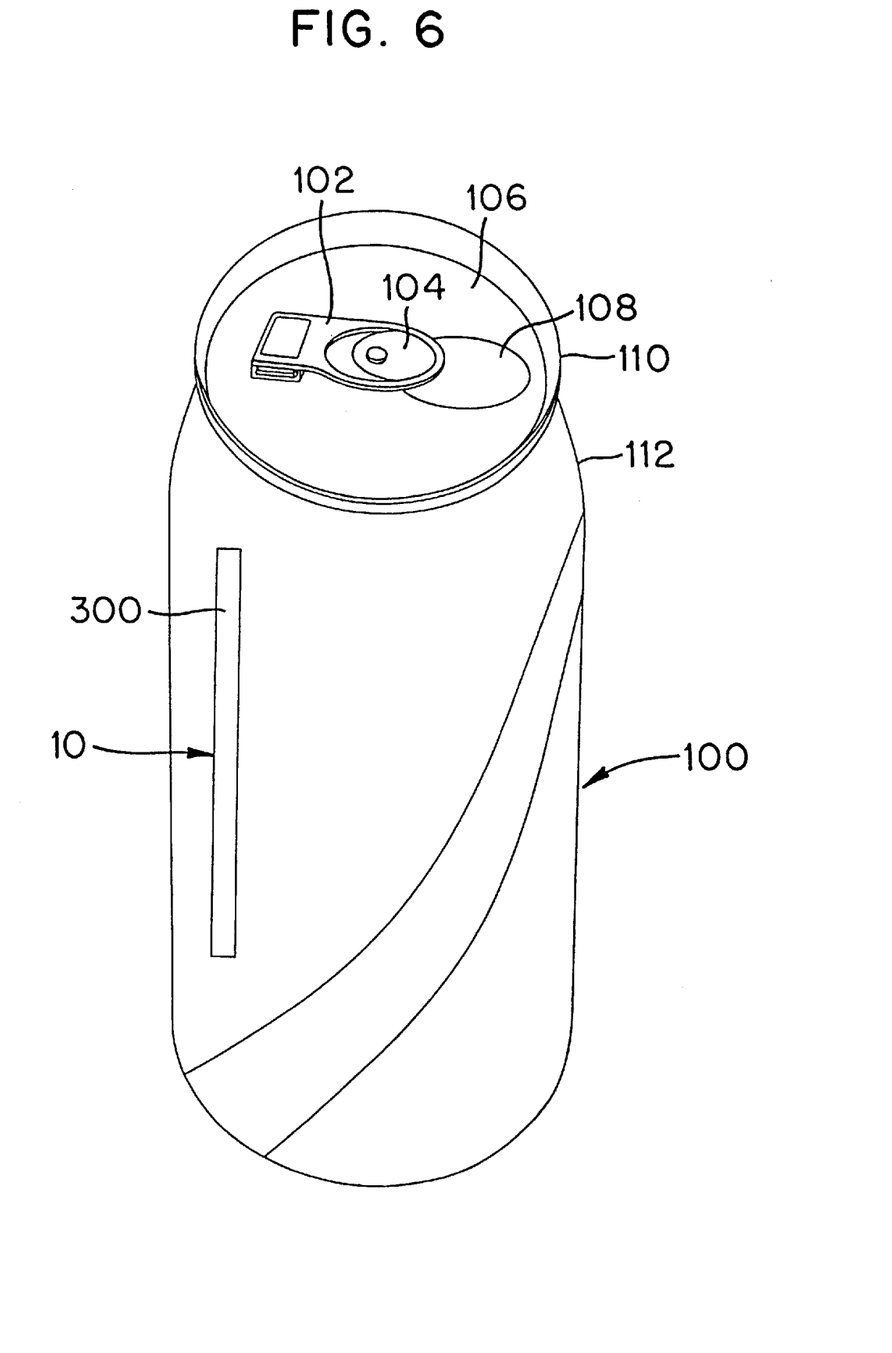
FIG. 6 shows a plan view of another embodiment of the responsive tag of the present invention attached to a recyclable container.

In another embodiment of the invention, the responsive tag 10, as illustrated in FIG. 6, may comprise a magnetic element 300 adapted to produce harmonic perturbations at a predetermined frequency when placed in an alternating electromagnetic field having a selected interrogation signal at the selected frequency above a certain field strength or threshold level. The magnetic element 300 may be an amorphous metal having a hysteresis loop showing a Barkhausen jump such as described in U.S. Pat. No. 4,660,025 or a pinned wall characteristic such as described in U.S. Pat. No. 4,980,670, both assigned to the same assignee hereof, and each capable of producing a unique harmonic response when excited by an AC magnetic field at above a certain field strength. When the field exceeds the threshold level, the magnetic element 300 produces a unique signal rich in harmonic content that is a detectable tag signal. By adapting each magnetic element to "switch" or produce its unique signal at a different threshold level with each level being associated with a different type of recyclable material, it is possible to identify that type of recyclable material. In a system using such magnetic materials, the generating component 204 of the recycling machine 200 would generate an alternating magnetic field at a selected frequency with the field strength of increasing amplitude. The detecting component 206 would detect the predetermined harmonic frequency or frequencies and would also correlate this with the threshold level of generating component 204 at which the predetermined detectable signal is first detected. In this way, the type of material on which the tag is attached could be determined. Tags having different threshold levels for each different recyclable material could be made by varying the time and temperature of the annealing process when making the element.

As shown in FIG. 6, the responsive tag 10 with the magnetic element 300 is attached or adhered to the body portion 112 of the recyclable container 100. The tag 10 and element 300 may be made quite thin and small, so that the tag 10 appears to be part of the container 100. The length of the tag used to identify recyclable materials could be appreciably shorter than the length of tag used in typical EAS systems for anti-theft purposes. The dimensions of the element 300 may be, for example, 20–100 mm in length and 0.04–3.0 mm in width.

A modified version of the reverse vending machine 200 of FIG. 5 is used to detect the magnetic element 300 of the responsive tag 10 and to identify the presence and type of recyclable material. Indeed, several components of the reverse-vending machine 200 need to be adjusted in order to detect a harmonic response of the magnetic element 300 of the responsive tag 10. For example, when using a responsive magnetic tag which produces a harmonic response, there is no need for the biasing component 202.

In another embodiment of the invention, different types of tags could be associated with different types of materials. For example, the Barkhausen type tag referred to above might be the tag for one type of recyclable material. For another type of material, a high permeability saturatable magnetic material such as permalloy or superpermalloy could be used as the responsive element of the tag. Because of the different hysteresis loop response for these two types of tags, the type of detectable signal that each type of tag produces is different and separately detectable. The predetermined detectable signal for each type of tag, therefore, could be related to the particular recyclable material to which each different tag is attached. The detecting component 206 in this system would be designed to analyze each detected signal to determined the harmonic frequency component of that signal which then is related to the type of material to which the tag is attached.

In a similar manner, radio frequency tags with different resonant frequencies, each related to a different type of recyclable material, could also be used as could other types of tags.

The responsive tag 10 of the present invention is also not limited to the configurations described herein but can be a variety of different sizes depending on its use. In addition, the tag 10 can be located anywhere on the surface of the container, the interior portions of the container, in the cap or lid portion or incorporated in the container itself. Further, any number of tags 10 can be used and incorporated in the recyclable container.

It will also be appreciated that the responsive tag 10 is not limited to having a housing 12 as illustrated in FIGS. 1–3. A variety of different types of protective portions or casings of a variety of materials can be used and can be integrally formed with or attached or adhered to a recyclable container. For example, as illustrated in FIG. 3, rolled seams 114 on the bottom surface 102b of the tab portion 102 of the container 112 can be used to support the magnetostrictive element 14. The tab portion 102 itself, can also be further modified or formed to house the magnetostrictive element 14.

The responsive tag 10 can be incorporated in many types of recyclable containers besides the container as illustrated in FIGS. 1–3. The use of the word "container" herein is intended to cover any object intended to be recyclable. Indeed, the container to which the tag 10 is attached, adhered or incorporated thereto can be any type, size, material, etc., which is recyclable or has some type of recyclable material therein.

In all cases it is understood that the above-described arrangements are merely illustrative of the many possible specific embodiments which represent applications of the present invention. Numerous and varied other configurations, can be readily devised in accordance with the principles of the present invention without departing from the spirit and scope of the invention.

What is claimed is:

1. A system for identifying a type of recyclable material from different types of recyclable materials, comprising:

a. a recyclable material;

b. an element attached to the recyclable material, the element subjected to a plurality of different interrogation signals associated with the different types of recyclable materials and responding to only a selected interrogation signal from among the plurality of different interrogation signals associated with the different types of recyclable materials, said element providing a predetermined detectable signal associated with a particular type of recyclable material based upon the selected interrogation signal in order to identify the particular type of recyclable material to which the element is attached; and c. recycling means comprising means for generating the plurality of different interrogation signals associated with the different types of recyclable materials including the selected interrogation signal, means for detecting the predetermined detectable signal generated by said element of the tag and means for accepting the particular type of recyclable material when said predetermined detectable signal generated by said element is detected.

2. A system in accordance with claim 1, wherein said element is a magnetostrictive element dimensioned to resonate mechanically at a predetermined frequency when said element is biased by a D.C. magnetic field and said plurality of different interrogation signals comprises an alternating magnetic field operating at a selected frequency.

3. A system in accordance with claim 2, further comprising a housing to be attached to said recyclable material and having a recess formed integrally therein, said recess formed for housing said magnetostrictive element without constraining the mechanical resonance of the element.

4. A system in accordance with claim 2, wherein said predetermined detectable signal is in a range of about 120 kHz to 170 kHz.

5. A system in accordance with claim 3, wherein said D.C. magnetic field to bias said magnetostrictive element is applied from outside said housing.

6. A system in accordance with claim 1, wherein said element is an amorphous metal, said plurality of different interrogation signals comprises an alternating magnetic field operating at a selected frequency and the predetermined detectable signal is composed of one or more harmonic frequencies of said selected frequency.

7. A system in accordance with claim 6, wherein said predetermined detectable signal having the harmonic response is at a detectable frequency in a range of about 100 Hz to 25 kHz.

8. A system for identifying a type of recyclable material from different types of recyclable materials, comprising:

a. a recyclable material having a body portion;

b. a tag attached to said body portion for identifying a particular type of recyclable material from the different types of recyclable materials, the tag comprising an element, said element subjected to a plurality of different interrogation signals associated with the different types of recyclable materials and responding to only a selected interrogation signal from among the plurality of different interrogation signals associated with the different types of recyclable materials to provide a predetermined detectable signal associated with the particular type of recyclable material based upon the selected interrogation signal in order to identify the particular type of recyclable material to which the tag is attached; and c. recycling means comprising means for generating the plurality of different interrogation signals associated with the different types of recyclable materials including the selected interrogation signal, means for detecting the predetermined detectable signal generated by said element of the tag and means for accepting the particular type of recyclable material when said predetermined detectable signal generated by said element is detected.

9. A system in accordance with claim 8, wherein said body portion includes a top surface portion and a tab portion attached to said top surface portion, said tag being attached to said tab portion.

10. A system in accordance with claim 9, wherein said element is a magnetostrictive element dimensioned to resonate mechanically at a predetermined frequency when said element is biased by a D.C. magnetic field and said plurality of different interrogation signals comprises an alternating magnetic field operating at a selected frequency.

11. A system in accordance with claim 10, said tag further comprising a housing attached to said body portion, said housing having a recess formed integrally therein, said recess formed for housing said magnetostrictive element without constraining the mechanical resonance of the element.

12. A system in accordance with claim 11, wherein said predetermined detectable signal is in a range of about 120 kHz to 170 kHz.

13. A system in accordance with claim 12, wherein said recyclable material is in the shape of a container.

14. A system in accordance with claim 8, wherein said element is an amorphous metal, said plurality of different interrogation signals comprises an alternating magnetic field operating at a selected frequency and the predetermined detectable signal is composed of one or more harmonic frequencies of said selected frequency.

15. A system in accordance with claim 14, wherein said predetermined detectable signal having the harmonic response is at a detectable frequency in a range of about 100 Hz to 25 kHz.

16. A system in accordance with claim 15, wherein said recyclable material is in the shape of a container.

17. A method of identifying a type of recyclable material from different types of recyclable materials, comprising the steps of:

a. attaching a responsive tag to a particular type of recyclable material, said responsive tag comprising an element, said element subjected to a plurality of different interrogation signals associated with the different types of recyclable materials and responding to only a selected interrogation signal from among the plurality of different interrogation signals associated with the different types of recyclable materials to provide a predetermined detectable signal associated with the particular type of recyclable material based upon the selected interrogation signal for identifying the particular type of recyclable material to which the tag is attached;

b. placing the recyclable material with said tag attached thereto into an apparatus for identifying said recyclable material;

c. generating the plurality of different interrogation signals associated with the different types of recyclable materials including the selected interrogation signal;

d. detecting the predetermined detectable signal generated by said tag when subjected to said selected interrogation signal; and e. accepting said recyclable material when said predetermined detectable signal corresponds to the predetermined detectable signal associated with said particular type of recyclable material.

18. A method in accordance with claim 17, wherein:
said element comprises a magnetostrictive element dimensioned to resonate mechanically at a predetermined frequency; and
said plurality of different interrogation signals comprises an alternating magnetic field at a selected frequency.

19. A method in accordance with claim 18, further including the step of applying a D.C. magnetic field to said magnetostrictive element after placing the recyclable material with said tag attached into said apparatus for identifying said recyclable material.

20. A method in accordance with claim 19, wherein the D.C. magnetic field is generated by the apparatus for identifying said recyclable material.

21. A method in accordance with claim 20, further comprising the steps of crushing the recyclable material; and
storing the crushed recyclable material.

22. A method in accordance with claim 17, wherein:
said element comprises an amorphous metal, said selected interrogation signal is an alternating magnetic field operating at a selected frequency and the predetermined detectable signal is composed of one or more harmonic frequencies of said selected frequency.

23. A method in accordance with claim 22, further including the step of applying an A.C. magnetic field to said element after placing the recyclable material with said tag attached into said apparatus for identifying said recyclable material.

24. A method in accordance with claim 23, wherein the A.C. magnetic field is generated by the apparatus for identifying said recyclable material.

25. A method in accordance with claim 24, further comprising the steps of crushing the recyclable material; and
storing the crushed recyclable material.

26. A system for identifying a type of recyclable material from different types of recyclable materials, comprising:
a. a recyclable material;
b. a responsive tag attached to said recyclable material, the tag comprising an element, said element subjected to a plurality of different interrogation signals associated with the different types of recyclable materials and responding to only a selected interrogation signal from among the plurality of different interrogation signals associated with the different types of recyclable materials to provide a predetermined detectable signal associated with a particular type of recyclable material based upon the selected interrogation signal in order to identify the particular type of recyclable material to which the tag is attached; and
c. recycling means comprising means for generating the plurality of different interrogation signals associated with the different types of recyclable materials including the selected interrogation signal, means for detecting the predetermined detectable signal generated by said element of the tag and means for accepting the particular type of recyclable material when said predetermined detectable signal generated by said element is detected.

27. A system in accordance with claim 26, wherein said element comprises a magnetostrictive element dimensioned to resonate mechanically at a predetermined frequency when said element is biased by a magnetic bias field being applied thereto and said plurality of different interrogation signals includes an alternating magnetic field.

28. A system in accordance with claim 27, wherein said recyclable material has a body portion and said responsive tag further includes a housing attached to said body portion and having a recess formed integrally therein, said recess formed for housing said magnetostrictive element without constraining the mechanical resonance of the element.

29. A system in accordance with claim 28, wherein said recycling means further includes means for biasing said magnetostrictive element by applying a D.C. magnetic field to said element.

30. A system in accordance with claim 29, wherein said predetermined detectable signal is in a range of about 120 kHz to 170 kHz.

31. A system in accordance with claim 30, wherein said recyclable material is in the shape of a container.

32. A system in accordance with claim 26, wherein said element is an amorphous metal, said plurality of different interrogation signals comprises an alternating magnetic field operating at a selected frequency and the predetermined detectable signal is composed of one or more harmonic frequencies of said selected frequency.

33. A system in accordance with claim 32, wherein said predetermined detectable signal having the harmonic response is at a detectable frequency in a range of about 100 Hz to 25 kHz.

34. A system in accordance with claim 33, wherein said recyclable material is in the shape of a container.

35. A system for identifying a type of recyclable material from different types of recyclable materials, comprising:
a. a recyclable material;
b. an element attached to a recyclable material, the element subjected to a selected interrogation signal comprising a plurality of different frequencies associated with the different types of recyclable materials and responding to only one frequency from among the plurality of different frequencies associated with the different types of recyclable materials to provide a predetermined detectable signal associated with a particular type of recyclable material based upon said one frequency from the selected interrogation signal in order to identify the particular type of recyclable material to which the element is attached; and
c. recycling means comprising means for generating the plurality of different interrogation signals associated with the different types of recyclable materials including the selected interrogation signal, means for detecting the predetermined detectable signal generated by said element of the tag and means for accepting the particular type of recyclable material when said detectable signal generated by said element is detected.

* * * * *

UNITED STATES PATENT AND TRADEMARK OFFICE
CERTIFICATE OF CORRECTION

PATENT NO. : 5,947,256
DATED : September 7, 1999
INVENTOR(S) : Hubert A. Patterson It is certified that error appears in the above-identified patent and that said Letters Patent is hereby corrected as shown below:

Col. 6, line 24, delete "determined" and insert -- determine --.

Signed and Sealed this

Twenty-eighth Day of November, 2000

Attest:

Q. TODD DICKINSON

*Attesting Officer*            *Director of Patents and Trademarks*